United States Patent
Hsu et al.

(10) Patent No.: US 11,340,990 B2
(45) Date of Patent: May 24, 2022

(54) SYSTEM AND METHOD TO RUN BASIC INPUT/OUTPUT SYSTEM CODE FROM A NON-VOLATILE MEMORY EXPRESS DEVICE BOOT PARTITION

(71) Applicant: DELL PRODUCTS, LP, Round Rock, TX (US)

(72) Inventors: Isaac S. Hsu, Taipei (TW); Lip Vui Simon Kan, Hillbrooks (SG); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 16/780,464

(22) Filed: Feb. 3, 2020

(65) Prior Publication Data

US 2021/0240567 A1    Aug. 5, 2021

(51) Int. Cl.
  *G06F 11/14* (2006.01)
  *G06F 13/42* (2006.01)
  *G06F 9/4401* (2018.01)
  *G06F 11/07* (2006.01)

(52) U.S. Cl.
  CPC ........ *G06F 11/1417* (2013.01); *G06F 9/4406* (2013.01); *G06F 9/4408* (2013.01); *G06F 11/0772* (2013.01); *G06F 11/1469* (2013.01); *G06F 13/4282* (2013.01)

(58) Field of Classification Search
  CPC ............... G06F 11/1417; G06F 9/4406; G06F 11/0772; G06F 11/1469; G06F 13/4282; G06F 9/4408
  See application file for complete search history.

(56) References Cited

U.S. PATENT DOCUMENTS

| | | | |
|---|---|---|---|
| 9,846,617 B2 | 12/2017 | Rahardjo et al. | |
| 2008/0195796 A1 | 8/2008 | Wang et al. | |
| 2015/0074386 A1* | 3/2015 | Huang | G06F 9/4401 713/2 |
| 2015/0331754 A1 | 11/2015 | Grobelny | |
| 2016/0124816 A1* | 5/2016 | Huang | G06F 11/1417 714/15 |
| 2018/0074884 A1* | 3/2018 | Cady | G06F 11/0787 |
| 2018/0107558 A1* | 4/2018 | Rahardjo | G06F 11/1417 |
| 2018/0239609 A1 | 8/2018 | Jang et al. | |
| 2019/0095221 A1 | 3/2019 | Zhan et al. | |

(Continued)

OTHER PUBLICATIONS

Gopal et al., U.S. Appl. No. 16/422,060 entitled 'NVDIMM Serial Interface for Outof-Band Management by a Baseboard Management Controller and Method Therefor' filed May 24, 2019.

(Continued)

*Primary Examiner* — Glenn A. Auve
(74) *Attorney, Agent, or Firm* — Larson Newman, LLP (57) ABSTRACT

An information handling system may include an embedded controller, a serial peripheral interface (SPI) read-only memory (ROM) device to store a first basic input/output system (BIOS) firmware for the information handling system, and a non-volatile memory device includes a boot partition to store a second BIOS firmware. The embedded controller detects a failure during a boot process, switches a first SPI of a chipset from the SPI ROM to the embedded controller and executes the second BIOS firmware from the non-volatile memory device via a sideband access of the non-volatile memory device.

20 Claims, 4 Drawing Sheets

(56) References Cited

U.S. PATENT DOCUMENTS

| | | |
|---|---|---|
| 2019/0163497 A1 | 5/2019 | Samuel et al. |
| 2019/0286436 A1 | 9/2019 | Liu et al. |
| 2019/0287588 A1 | 9/2019 | Montero et al. |
| 2020/0042710 A1* | 2/2020 | Liu .................... G06F 9/44505 |
| 2020/0272738 A1* | 8/2020 | Shroff ....................... G06F 8/65 |
| 2021/0117272 A1* | 4/2021 | Kleppinger ......... G06F 11/1461 |
| 2021/0322816 A1* | 10/2021 | Kassiantchouk ......... A45F 3/14 |

OTHER PUBLICATIONS

Zhu et al., U.S. Appl. No. 16/363,978 entitled 'System and Method to Install Firmware Volumes from NVMe Boot Partition' filed Mar. 25, 2019.

* cited by examiner

FIG. 4

SYSTEM AND METHOD TO RUN BASIC INPUT/OUTPUT SYSTEM CODE FROM A NON-VOLATILE MEMORY EXPRESS DEVICE BOOT PARTITION

FIELD OF THE DISCLOSURE

The present disclosure generally relates to information handling systems, and more particularly relates to running basic input/output system code from a non-volatile memory express device boot partition.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller, a serial peripheral interface (SPI) read-only memory (ROM) device to store a first basic input/output system (BIOS) firmware for the information handling system, and a non-volatile memory device includes a boot partition to store a second BIOS firmware. The embedded controller may detect a failure during a boot process, switch a first SPI of a chipset from the SPI ROM to the embedded controller, and execute the second BIOS firmware from the non-volatile memory device via a sideband access of the non-volatile memory device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
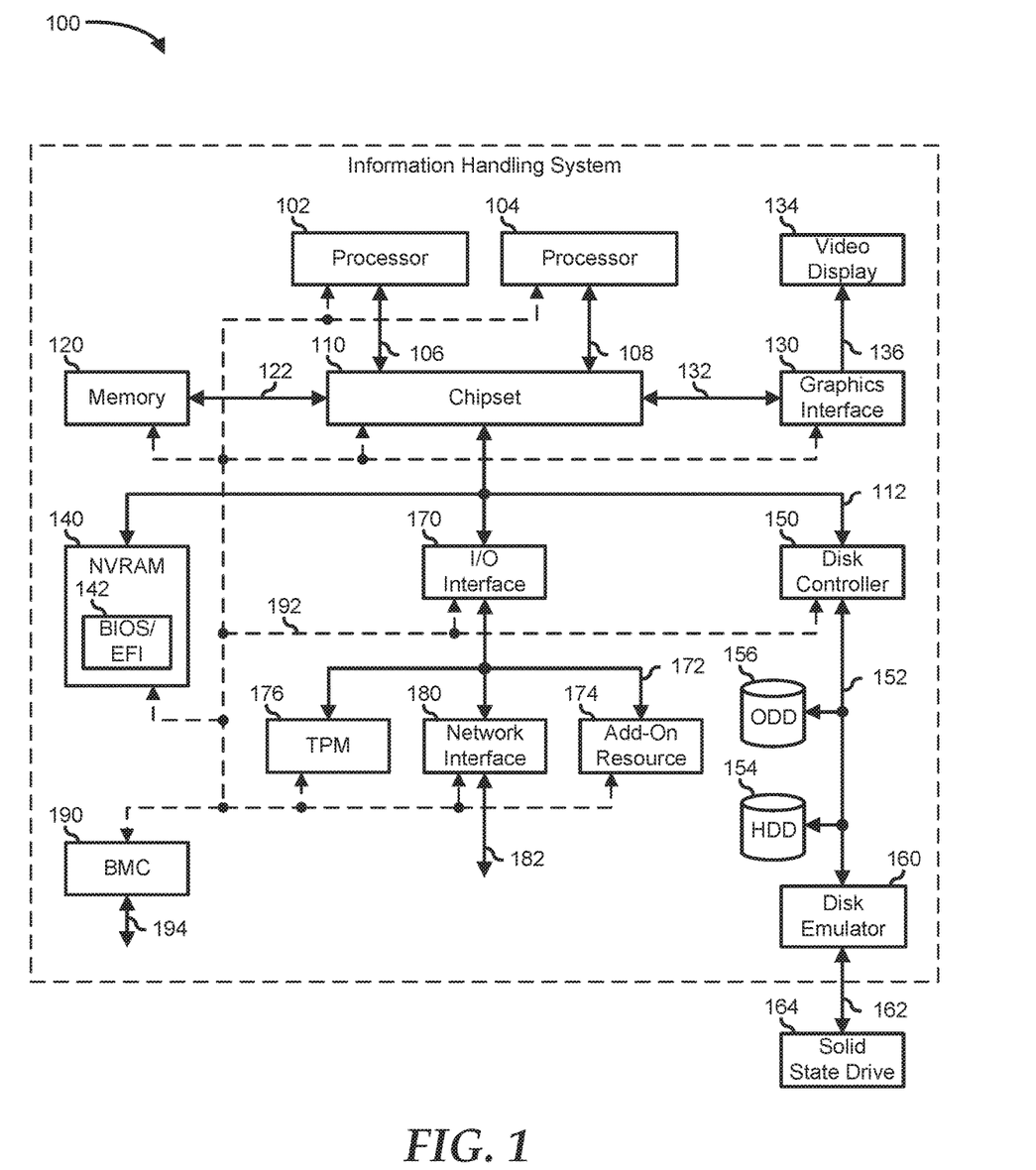
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniB and channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band network access or simply out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus, BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

BIOS/EFI 142 can be referred to as a BIOS code, a BIOS image, a firmware image, a BIOS firmware, and the term BIOS is herein used interchangeably with the term firmware image or simply firmware. BIOS/EFI 142 includes instructions executable by processors 102 and 104 to initialize and test the hardware components of information handling system 100, and to load a boot loader or an operating system from a mass storage device. BIOS/EFI 142 additionally provides an abstraction layer for the hardware, i.e. a consistent way for application programs and operating systems to interact with the keyboard, display, and other input/output devices. When power is first applied to information handling system 100, information handling system 100 begins a sequence of initialization procedures. During the initialization sequence, also referred to as a boot sequence, components of information handling system 100 are configured and enabled for operation, and device drivers can be installed. Device drivers provide an interface through which other components of the information handling system 100 can communicate with a corresponding device.

In an embodiment, the BIOS/EFI 142 can be substantially compliant with one or more revisions of the united extensible firmware interface (UEFI) specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage the initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of information handling system 100. While the techniques disclosed herein are described in the context of a UEFI compliant system, one of skill in the art will appreciate that aspects of the disclosed systems and methods can be implemented at substantially any information handling system having configurable firmware.

Information handling systems typically use the BIOS firmware such as BIOS/EFI 142 to perform fundamental operations, such as performing a power-on self-test (POST), loading an operating system, and other low-level operations. The BIOS firmware can become corrupted by malicious activities or as a result of operation failure. For example, the BIOS firmware at an information handling device can be corrupted if power provided to the information handling system is not maintained during a firmware update procedure. If a portion of the BIOS firmware is corrupted, the information handling system may fail to become operational. A complete or partial BIOS recovery method or procedure is likely required to replace the corrupted BIOS firmware with a BIOS firmware that is not corrupted.

While some attempts to provide the BIOS recovery feature to recover the BIOS stored in an SPI flash memory device have been made, they suffer certain limitations. For example, if the failure to boot is due to a hardware failure of the SPI flash memory device then the BIOS cannot be recovered using software BIOS recovery methods. Solutions to recover from the hardware failure of the SPI flash memory device typically require a second SPI flash memory device of the same density as the main SPI flash memory device connected to the chipset. However, a BIOS recovery method using two SPI flash memory devices results in higher component costs. An embedded controller (EC)/non-volatile memory express (NVMe) device design architecture, also referred to as an EC/NVMe architecture, is proposed for the recovery of the BIOS firmware during a hardware failure of the SPI flash memory device or for the recovery of an invalid/corrupted BIOS firmware without using a second SPI flash memory device.

Figure 2:
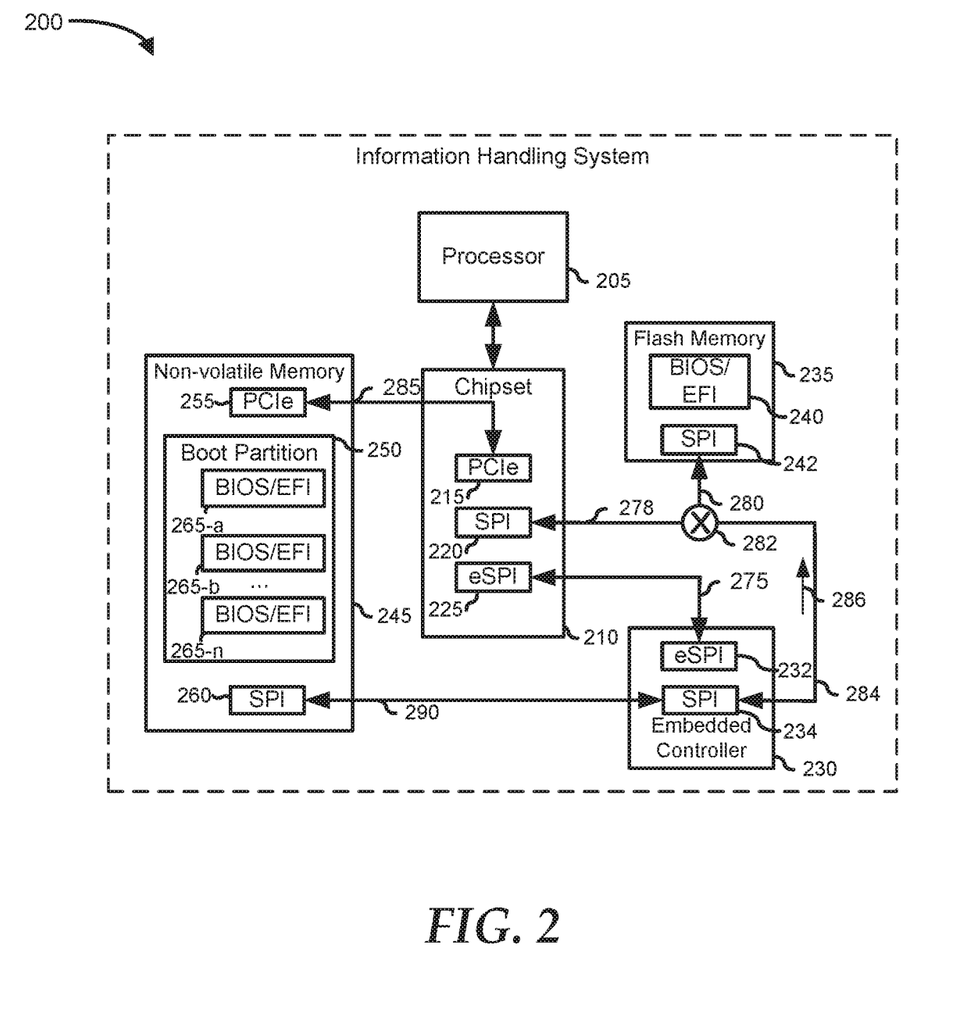
FIG. 2 is a block diagram of an embedded controller/non-volatile memory express architecture according to another embodiment of the present disclosure.

FIG. 2 shows a portion of an information handling system 200 that similar to the information handling system 100. Information handling system 200 includes a processor 205, a chipset 210, an embedded controller 230, a flash memory 235 and a non-volatile memory device 245. Embedded controller 230 includes an eSPI 232 and an SPI 234. Flash memory 235 includes a BIOS/EFI 240 and an SPI 242. Chipset 210 includes a PCIe 215, an SPI 220, and an enhanced SPI (eSPI) 225. Non-volatile memory device 245 includes a PCIe 255, an SPI 260, and a boot partition 250. PCIe 255 is connected to PCIe 215 via SPI bus 285. SPI 220 is connected to SPI 242 via SPI bus 278 and SPI bus 280 through a multiplexer 282. SPI 220 is connected to SPI 234 via SPI bus 278 and SPI bus 284 through multiplexer 282. The eSPI 225 is connected to eSPI 232 via eSPI bus 275. SPI 290 is connected to SPI 234 via SPI bus 290 or an SMBus. Boot partition 250 includes BIOS/EFI 265a-265n. One or more components in information handling system 200 can be integrated together. For example, portions of chipset 210 can be integrated within processor 205.

In an embodiment, the EC/NVMe architecture in information handling system 200 includes embedded controller 230 with a connection to chipset 210 via eSPI 232 on one end and non-volatile memory device 245 via SPI 234 and on the other end. At this point, chipset 210 has access to flash memory 235 through multiplexer 282. In addition, access of chipset 210 to embedded controller 230 via SPI bus 284 is blocked by multiplexer 282 or using internal logic of embedded controller 230. During the boot operation of information handling system 200, when embedded controller 230 detects that there is a hardware failure for example flash memory 235 fails or that BIOS/EFI 240 is invalid or corrupted, embedded controller 230 would translate chipset 210 SPI 220 access with flash memory 235 to access to boot partition 250 via SPI 260 through SPI 234 of embedded controller 230 using multiplexer 282. For example, a control signal 286 may be transmitted to multiplexer 282 to close SPI bus 280 and open SPI bus 284 allowing chipset 210 access to embedded controller 230 via SPI bus 278 and SPI bus 284. In another embodiment, embedded controller 230 may use internal logic to divert chipset 210 from using BIOS/EFI 240 in flash memory 240. In other words, embedded controller 230 would create a "virtual" SPI ROM that emulates flash memory 235 and provide chipset 210 access to boot partition 250 via the embedded controller 230 SPI bus 290 connection.

To chipset 210, the virtual SPI ROM looks and behaves like flash memory 235. This way, the chipset deems that flash memory 235 and BIOS/EFI 240 are functional and would continue the boot process from one of BIOS/EFI 265a-265n in boot partition 250. Since boot partition 250 generally is larger than flash memory 235, there can be multiple BIOS/EFI firmware as backup or for other types of applications such as UEFI, Coreboot® for Windows, Chrome OS, etc. where one can be used to recover BIOS/EFI 240. In addition, one of BIOS/EFI 265a-265n can be encrypted and/or authenticated for the boot process to harden security. After successfully a successful boot operation and/or BIOS recovery, embedded controller 230 may send another control signal to multiplexer 282 or an internal logic to re-open SPI bus 280 and close SPI bus 284 allowing chipset 210 access to flash memory 235 in preparation for a next boot operation.

In various embodiments, information handling system 200 may be a single-processor system or a multi-processor system including two or more processors. As shown, processor 205 is similar to processor 102 may include any processor capable of executing program instructions, such as a Pentium series processor, or any general-purpose or embedded processors implementing any or a variety of instruction set architectures (ISAs), such as an X86 ISA or a reduced instruction set computer (RISC) ISA such as performance optimization with enhanced RISC performance computing (PowerPC)™, advanced RISC machine (ARM), scalable processor architecture (SPARC), microprocessor without interlocked pipelined stages (MIPS), etc. Processor 205 may also be referred to as a CPU.

As shown, chipset 210 also referred to as a platform controller hub (PCH) is similar to chipset 110 which may include one or more integrated circuits coupled to processor 205. In certain embodiments, chipset 210 may utilize a QuickPath Interconnect to communicate with processor 205. Chipset 210 provides processor 205 with access to a variety of resources. For instance, chipset 210 provides access to non-volatile memory device 245 which may be configured to store program instructions and/or data accessible by processor 205. In various embodiments, non-volatile memory device 245 may be implemented using any suitable memory technology, such as SRAM, DRAM, or magnetic disks, or any non-volatile/flash-type memory, such as an SSD or the like. Chipset 210 may be coupled to PCIe 255 of non-volatile memory device 245 over PCIe bus 285 through PCIe 215.

Non-volatile memory device 245 includes a non-volatile memory-express (NVMe) SSD or SATA hard drive or the like that supports boot partitioning that can be accessed during the BIOS boot process such as from the PEI phase. For example, one or more of BIOS 265a-265n in boot partition 250 of non-volatile memory device 245 may be accessed during the different stages of the boot process. A serial bus interface such as an SMBUS or SPI bus 290 provided at non-volatile memory device 245 is configured to provide out-of-band access and/or sideband access to embedded controller 230. As used herein, out-of-band access refers to operations performed without the support of processor 205, such as prior to the execution of BIOS code by processor 205 to initialize operation of information handling system 200. As used herein, sideband access provides access to non-volatile memory device 245 in addition to typical access provided such as via PCI bus 285. For example, the sideband access may be used by embedded controller 230 to read BIOS/EFI 265a-265n stored in boot partition 250 during the boot process or recovery of BIOS/EFI 240.

Thus, the term "boot partition" as used herein is understood in the context of NVMe devices such as non-volatile memory device 245, is in accordance with an NVMe 1.3 revision level specification for a partition of an NVMe device that is accessible during one or more of the PEI phase, the DXE phase, or the TSL phase of a UEFI boot process, or similar stages of a BIOS boot process. As such, the term "boot partition" as used herein is separate and distinct from a conventional use of the term "boot partition" as related to, for example, SSD or SATA hard drives, where a "boot partition" is a disk partition for storing an operating system boot image that is used by an operating system boot loader during a TSL phase of the UEFI boot process or a similar stage of the BIOS boot process. Thus, the boot partition emulates the SPI flash memory device. Further, with the EC/NVMe architecture, one or more of BIOS/EFI 265a-265n in boot partition 250 can be encrypted to harden the security.

A controller in non-volatile memory device 245 can manage access initiated by embedded controller 230 over SPI bus 290 and to perform traditional activities at non-volatile memory device 245 such as copying of data to non-volatile memory device 245. In an embodiment, installation system firmware such as one of BIOS 265a-265n may be initiated by a remote administration station, a keyboard, mouse, and video monitor (KVM) station, a BMC, a secure processor, or the like. While the current embodiment utilizes an SPI bus communicate with non-volatile memory device 245, an SMBUS to may be used instead. In another embodiment, during initialization of information handling system 200, embedded controller 230 can communicate with BIOS 265a, for example, to store or retrieve drives, variables, and the like. In another embodiment, SPI bus 290 can utilize any suitable standard or proprietary bus protocol, such as eSPI, SPI, controller area network (CAN), I3C, I²C, and the like. In an embodiment, SPI bus 290 can include more than one channel, for example, similar to dual-SPI, Quad SPI, and the like. Accordingly, data rates of sixty mega-Bytes per second or greater can be provided by SPI bus 290.

Embedded controller 230 may be implemented as a microcontroller that handles tasks the operating system of information handling system 200 does not handle, such as receiving and processing signals from a keyboard, turning information handling system 200 on and off, thermal measurement and response, controlling visual indicators, managing a battery, allowing remote diagnostics, service, and remediation, etc. During operation, embedded controller 230 can utilize SPI bus 290 to access non-volatile memory device 245 for a variety of purposes, such as to store and/or retrieve information at non-volatile memory device 245 including boot partition 250, independent of whether processor 205 is initialized or operational.

Flash memory 235 includes a non-volatile memory device capable of being electrically erased and re-programmed. Flash memory 235 may include any number of partitions; each partition may hold instructions or data for different components of information handling system 200 such as BIOS/EFI 240 that is used during a boot process. Flash memory 235 may also be referred to as SPI flash or SPI ROM and is similar to NVRAM 140 of FIG. 1.

BIOS/UEFI firmware such as BIOS/EFI 240 is typically stored in a flash memory device such as flash memory 235 of information handling system 200. Flash memory devices have the benefit that the data stored thereon is non-volatile, and so the data is retained when the information handling system 200 is powered off. However, the capacity of a flash memory device is typically small when compared with other memory devices, such as non-volatile memory device 245 and Dynamic Random-Access Memory (DRAM) Dual In-Line Memory Modules. For example, a typically available flash memory device or SPI ROM may have a capacity of 16-32 megabytes (MB), while DIMMs and NVMe SSDs typically have capacities measured in gigabytes (GB). As such, flash memory devices are typically selected based upon a tradeoff between the device cost and the size of the computer firmware needed to operate the information handling system. Further, once an information handling system has been designed and produced, the size of the flash memory is fixed and not upgradable because the flash memory devices are typically mounted directly to a motherboard of the information handling system.

For this reason, the BIOS/EFI code size is carefully managed to fit within the size restriction imposed by the flash memory device. Thus, while increased BIOS/EFI code functionality may be desirable, it is often difficult to justify increases in the size of the flash memory device to accommodate the increased functionality. Some features that are typically not included in a BIOS/EFI code due to size constraints imposed by the flash memory device size may include diagnostic UEFI applications which may consume upwards of one MB, a BIOS/EFI based network stack driver which may consume upwards of one MB, a BIOS/EFI support application for remote support and recovery services which may consume upwards of four MB, custom logo and BIOS/EFI splash screen data which may consume upwards of one MB, or other utilities or functions, as needed or desired.

Moreover, due to the size limitation of the flash memory device in an information handling system, the flash memory device is typically populated only with a primary copy of the BIOS/EFI firmware. In particular, this means that a recovery image of the BIOS/EFI firmware is not resident on the flash memory device in case the primary BIOS/EFI firmware becomes corrupted, and elaborate procedures are typically needed to recover from a corrupted BIOS/EFI firmware or to update to a new version of the BIOS/EFI firmware. For example, a capsule update is a well-established method to update BIOS/EFI code components within an information handling system. Having the ability to store BIOS/EFI firmware in the boot partition such as boot partition 250 of a storage that is external to the flash memory device such as non-volatile memory device 245 allows the information handling system to recover from an invalid or corrupted BIOS/EFI firmware or update the BIOS/EFI firmware without considering the size limitation.

Figure 3:
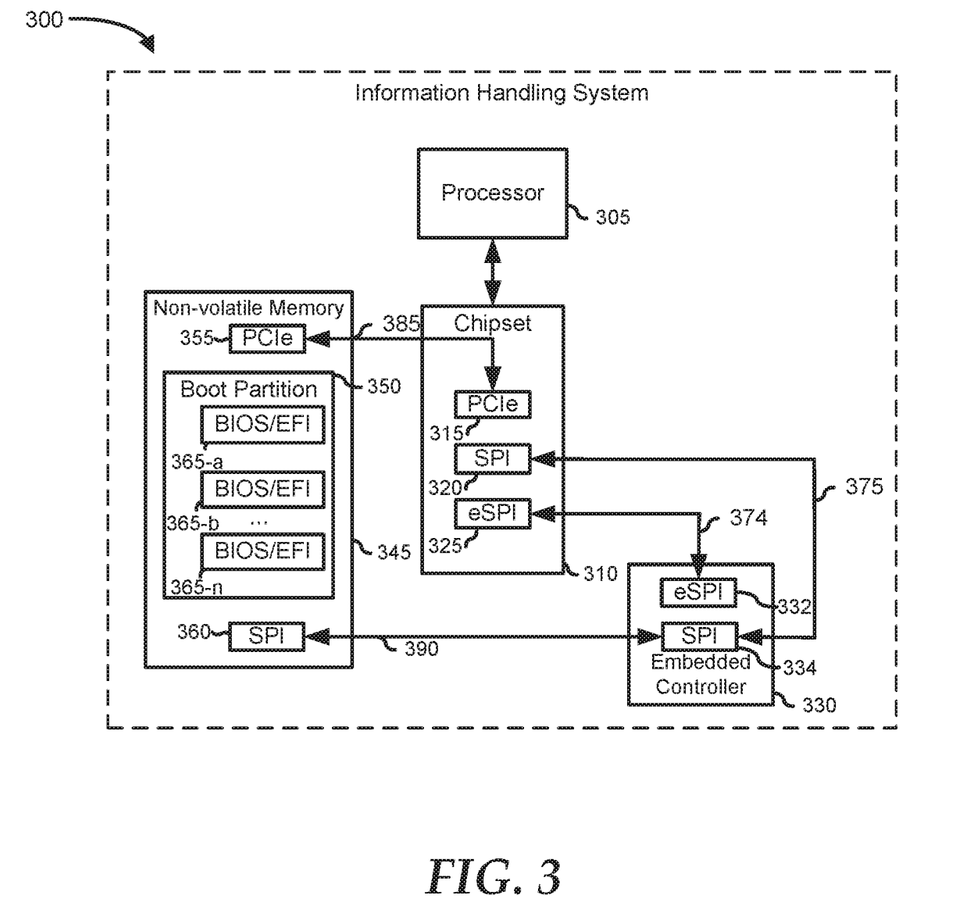
FIG. 3 is a block diagram of the embedded controller/non-volatile memory express architecture according to another embodiment of the present disclosure.

With the flexibility and capacity made available in boot partition 250, other distributions and uses of boot partition 250 should be understood to be within the scope of the present disclosure. In particular FIG. 3 illustrates a portion of an information handling system 300 similar to information handling system 200 in accordance with another embodiment of the present disclosure. Information handling system 300 includes a processor 305, a chipset 310, an embedded controller 330, and a non-volatile memory 345. Chipset 310 includes a PCIe 315, an SPI 320, and an eSPI 325. Embedded controller 330 includes an eSPI 332 and an SPI 334. Non-volatile memory 345 includes a PCIe 355, a boot partition 350, and an SPI 360. Boot partition 345 includes BIOS/EFI 365a-365n. The non-volatile memory device 345 may be any one of NVMe devices such as an NVMe PCIe SSD.

PCIe 355 of non-volatile memory 345 may be coupled to PCIe 315 of chipset 310 via PCIe bus 385. SPI 320 of chipset 310 may be coupled to SPI 334 of embedded controller 330 via SPI bus 375. The eSPI 325 of chipset 310 may be coupled to eSPI 332 of embedded controller 330 via eSPI bus 374. SPI 334 of embedded controller 330 may be coupled to SPI 360 of non-volatile memory device 345 via SPI bus 390 or an SMBus. One or more components in information handling system 300 can be integrated together. For example, portions of chipset 310 can be integrated within processor 305.

Here, information handling system 300 does not include a flash memory device that stores a BIOS/EFI firmware. This way, during the boot process, the BIOS/EFI code in one or more of BIOS/EFI 365a-365n may be accessed. In one embodiment, information handling system 300 may be configured to boot from one of BIOS/EFI 365a-365n. In another embodiment, during boot operation of the information handling system 300, when the embedded controller 330 detects that there is no SPI flash memory device, embedded controller 330 would access boot partition 350 of non-volatile memory device 345 through SPI bus 390 and reads one of BIOS/EFI 365a-365n. This way, the chipset deems that a "virtual SPI flash" exists and would then continue the boot process using the one of BIOS/EFI 365a-365n. Each one of BIOS/EFI 365a-365n may include different code for booting information handling system 300.

Figure 4:
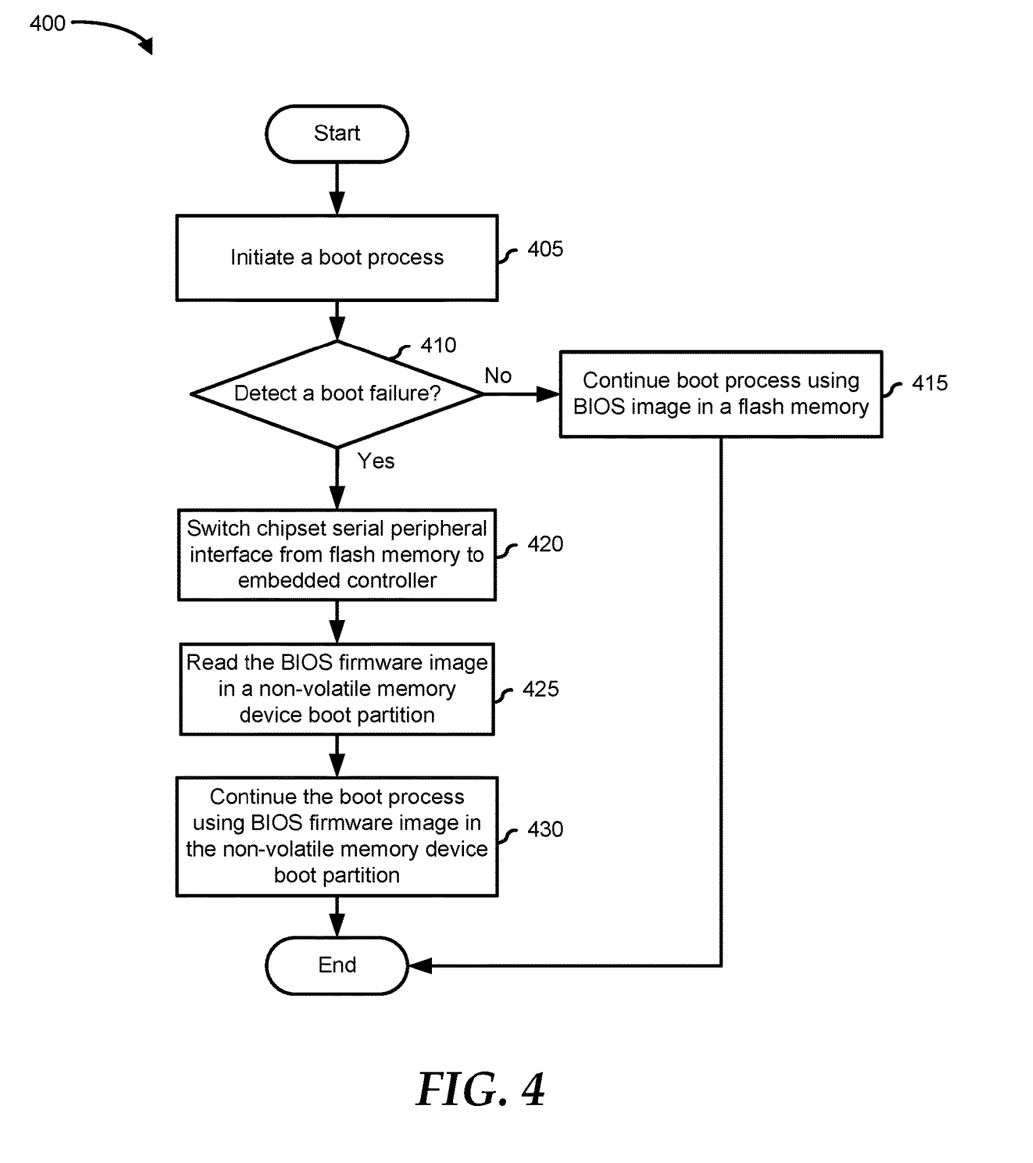
FIG. 4 is a flow diagram illustrating a method to run basic input/output system (BIOS) code from a non-volatile memory express device boot partition, according to an embodiment of the present disclosure.

FIG. 4 illustrates a method 400 for running BIOS firmware on a non-volatile memory device starting at block 405 where an initialization or boot process of an information handling system is started. The initialization process includes a PEI phase that is executed wherein system memory is initialized and PCIe, SPI, and eSPI links are enumerated and initialized in addition to other devices such as a non-volatile memory-express device. The method proceeds to decision block 410 where a decision is made on whether an embedded controller detects a boot failure such as SPI flash memory failure, an invalid, corrupt, or missing BIOS firmware during the initialization process.

If there is no detected boot failure, then the "NO" branch of the decision block 410 is taken and the method proceeds to block 415 where the information handling system continues with the initialization process using a BIOS firmware in an SPI flash memory device. If the embedded controller detects a boot failure, then the "YES" branch of decision block 410 is taken and the method proceeds to block 420 where the embedded controller switches the SPI of a PCH also referred to as a chipset from the SPI flash memory device to the non-volatile memory-express device via the SPI of the embedded controller. The switch is possible because the non-volatile memory-express device is configured to provide a common interface over multiple physical layers such as PCIe, eSPI, SMBus, I2C or the like for various functions such as inventory, monitoring, configuration, and change management. The non-volatile memory-express device includes NVMe PCIe SSDs or similar with one or more PCIe ports and one or more SMBus, eSPI, I2C port or the like.

The method proceeds to block 425 where after the switch, the embedded controller would read one of the BIOS firmware stored in the boot partition of the non-volatile memory-express device through a sideband interface. The BIOS firmware stored at the boot partition of the non-volatile memory-express device may be used to update a BIOS firmware stored at an SPI flash memory device also referred to as an SPI ROM. For example, a duplicate of the primary BIOS firmware can be stored at the non-volatile memory device to support BIOS recovery in the event that the primary BIOS firmware stored at the SPI flash memory device is corrupted or the SPI flash memory device failed. In another example, one of the BIOS firmware stored at the boot partition may be a modified copy of the BIOS firmware stored at the SPI flash memory device.

The embedded controller may also be referred to as a service processor or BMC may provide cryptography services to authenticate the BIOS firmware prior to storing the BIOS firmware at the boot partition of the non-volatile memory-express device. For example, the embedded controller can be used to verify a cryptographic signature associated with a BIOS firmware or with other encapsulated information prior to storing and/or using the BIOS firmware during the initialization process.

The sideband interface may be an SPI or an SMBus/I2C interface of the non-volatile memory-express device emulating the SPI flash memory device so that the chipset still thinks it is still reading from the SPI flash memory device and proceeds to block 430. At block 430, the method continues the boot process using the BIOS firmware stored in the boot partition of the non-volatile memory-express device.

Although FIG. 4 shows example blocks of method 400 in some implementation, method 400 may include additional blocks, fewer blocks, different blocks, or differently arranged blocks than those depicted in FIG. 4. Additionally, or alternatively, two or more of the blocks of method 400 may be performed in parallel. For example, block 425 and block 430 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   an embedded controller;
   a serial peripheral interface (SPI) read-only memory (ROM) device to store a first basic input/output system (BIOS) firmware for the information handling system; and
   a non-volatile memory device including a boot partition to store a second BIOS firmware, wherein the embedded controller detects a failure during a boot process, switches a first SPI of a chipset from the SPI ROM to the embedded controller and executes the second BIOS firmware from the non-volatile memory device via a sideband access of the non-volatile memory device.

2. The information handling system of claim 1, wherein the second BIOS firmware is a copy of the first BIOS firmware.

3. The information handling system of claim 1, wherein the embedded controller executes the second BIOS firmware from the boot partition of the non-volatile memory device.

4. The information handling system of claim 1, wherein the non-volatile memory device is a non-volatile memory-express (NVMe) solid state drive.

5. The information handling system of claim 1, wherein the sideband access is provided by a system management bus.

6. The information handling system of claim 1, wherein the second BIOS firmware is used to recover the first BIOS firmware.

7. The information handling system of claim 1, wherein the failure is an invalid first BIOS firmware.

8. The information handling system of claim 1, wherein the failure is an SPI ROM hardware failure.

9. The information handling system of claim 1, wherein the sideband access of the non-volatile memory device is via a second SPI.

10. The information handling system of claim 1, wherein the embedded controller is connected to the chipset via an enhanced SPI and the non-volatile memory device via a second SPI.

11. The information handling system of claim 1, wherein the embedded controller is connected to the chipset via an enhanced SPI and the non-volatile memory device via a system management bus.

12. The information handling system of claim 1, wherein the boot partition of the non-volatile memory device emulates a virtual SPI ROM device.

13. The information handling system of claim 1, wherein the second BIOS firmware is encrypted.

14. An information handling system, comprising:
    an embedded controller;
    a serial peripheral interface (SPI) read-only memory (ROM) device to store a first basic input/output system (BIOS) code for the information handling system; and
    a non-volatile memory device including a boot partition to store a second BIOS firmware, wherein the embedded controller detects a failure during a boot process, switches an SPI of a chipset from the SPI ROM to the embedded controller and recovers the first BIOS firmware based on the second BIOS firmware from the non-volatile memory device via an out-of-band network access.

15. The information handling system of claim 14, wherein the out-of-band network access of the non-volatile memory device is a second SPI.

16. The information handling system of claim 14, wherein the embedded controller is connected to the chipset via an enhanced SPI and the non-volatile memory device via a second SPI.

17. The information handling system of claim 14, wherein the boot partition of the non-volatile memory device emulates a virtual SPI ROM device.

18. A method comprising:
    storing a first basic input/output system (BIOS) firmware in a serial peripheral interface (SPI) read-only memory (ROM) device of an information handling system;
    storing a second BIOS firmware in a boot partition of a non-volatile memory-express device, wherein the boot partition of the non-volatile memory-express device can be accessed via an out-of-band network access;
    detecting a hardware failure during a boot process of the information handling system;
    switching an SPI of a chipset of the information handling system from the SPI ROM to an embedded controller; and
    recovering the first BIOS firmware in the SPI ROM based on the second BIOS firmware via the out-of-band network access.

19. The method of claim 18, wherein the embedded controller is connected to the chipset via an enhanced SPI and the non-volatile memory-express device via a second SPI.

20. The method of claim 18, wherein the boot partition of the non-volatile memory-express device emulates a virtual SPI ROM device.

* * * * *